United States Patent [19]
Bettinger

[11] Patent Number: 5,552,197
[45] Date of Patent: Sep. 3, 1996

[54] DYNAMIC POLYMER COMPOSITES

[76] Inventor: David S. Bettinger, 8030 Coventry, Grosse Ile, Mich. 48138

[21] Appl. No.: 149,092

[22] Filed: Nov. 5, 1993

[51] Int. Cl.⁶ ..................................................... B65B 53/00
[52] U.S. Cl. ...................... 428/34.9; 428/35.1; 428/35.7; 428/36.3; 428/36.9; 428/913
[58] Field of Search ................................. 428/34.9, 35.1, 428/35.7, 36.3, 36.9, 913

[56] References Cited

U.S. PATENT DOCUMENTS

| | | | |
|---|---|---|---|
| 4,260,143 | 4/1981 | Kliger | 267/148 |
| 4,442,153 | 4/1984 | Meltsch | 428/99 |
| 4,837,076 | 6/1989 | McCullough, Jr. et al. | 428/224 |
| 4,868,038 | 9/1989 | McCullough, Jr. et al. | 428/222 |
| 4,978,564 | 12/1990 | Douglas | 428/71 |
| 5,084,219 | 1/1992 | Sigur | 264/25 |
| 5,183,603 | 2/1993 | Kitajima et al. | 264/29.2 |
| 5,188,260 | 2/1993 | Bettinger | 222/95 |

OTHER PUBLICATIONS

*Mechanics of Composite Materials*, Ronald F. Gibson, McGraw–Hill, Inc. 1993, Section 10.4.1.
*Shape Memory Polymer*, Memory Technologies, Inc., 1993.
*Shape–Memory–Alloy Release Mechanism*, NASA Tech Briefs, Mar. 1993, pp. 89–90.
*Structural Modification of Simply–Supported Laminated Plates Using Embedded Shape Memory Alloy Fibers*, C. A. Rogers, C. Liang and J. Jia, Computer & Strucures, vol. 38, No. 5/6, pp. 569–580, 1991.

Primary Examiner—Christopher W. Raimund

[57] ABSTRACT

Composite materials which generate delayed dimensional change and force due to prestressed fibers constrained and controlled within and by a responsive polymer matrix which yields in a predetermined manner, and methods for preparing the same. In various embodiments the response may be externally-activated on-demand or self-activated time-dependent.

13 Claims, 1 Drawing Sheet

DYNAMIC POLYMER COMPOSITES

BACKGROUND OF THE INVENTION

1. Field of the Invention

This present invention relates to reinforced composite materials consisting of fibers and wires in a polymer matrix; and, in particular, to responsive, self-activating materials consisting of prestressed fibers and wires restrained and controlled in a polymer matrix which delays dimensional change and external force; and the processing steps for preparing said materials.

The composites of the present invention are force reservoirs which are not capable of resetting themselves to their original state without external intervention and reprocessing.

For the purposes of this current invention the term "fiber" is defined to mean a slender and greatly elongated shape from natural and synthetic materials which has tensile strength and comprises fiber, thread, fiber bundles, filament bundles, rod, and wire.

2. Description of the Prior Art

Since the advent of high-strength fibers and their incorporation into polymer composites, the focus within the prior art has been on the structural ability of composites to resist external forces. A multitude of fibers, fiber arrangements, and polymer matrix compositions have been utilized for structural composites. Structural composites are inert materials, resisting external loads. Inert structural polymer composites have found use in aerospace and recreational products. Some inert structural polymer composites have been used in force-generating mechanisms such as the composite archery bow. Composites used in the archery bow and in the "Carbon fiber reinforced composite coil spring" of U.S. Pat. No. 4,260,143 by Kliger are utilized as springs, resisting an external force. This present invention concerns composites that generate forces rather than resisting forces. The distinction is similar to that between a spring and a mouse trap. The mouse trap has a restraint and release function in addition to the tensioned spring. In this present invention the polymer matrix is the responsive component and acts to restrain, balance, and control stress that was induced in the fibers during the process for preparing the composite material. Dimensional change or strain, force, energy, and activation method are inherent functions of the composite material of this present invention that are determined prior to fabrication.

In the prior art, prestress has been used to render materials and structures resistant to force loadings. The process of prestressing the fibers and strands within composites is well known in the construction of prestressed and post-tensioned concrete structural members. Prestressed concrete is inert and unresponsive, and the release of prestress has usually proved catastrophic to the structure. This present invention uses prestress to store internal energy which by delayed release is utilized external to the material.

In the prior art Rogers et al. used prestress in a responsive composite with internal heating elements. In Rogers the prestressed Nitinol wire expanded the range of the structural modulus of the composite. Rogers composite did not generate an external force, or a dimensional change at the face of the thermoset matrix. The responsive component of the Rogers composite is the shape memory alloy wire, not the polymer matrix. Rogers describes heating the Nitinol wire by electricity, but the external faces of the Rogers composite are not likely to change dimension in a predictable way because the hot wire will likely lose bond with the thermoset epoxy matrix. Rogers describes the prestressed wire as generating a point load on the face of the polymer, which is an indication that little or no bond stress exists between the prestressed element and the polymer matrix, unlike the current invention.

In related art Sigur in U.S. Pat. No. 5,084,219 uses a heat-expanding material to prestress a fiber overwrap onto a composite tube to make a structural member. Sigur combines composite, prestressed fiber, and heat-responsive foam elements. However, the composite is not the responsive element, the prestressed element is outside the composite, the prestress is never released, and the resulting structure is inert. In contrast this present invention combines responsive and prestressed attributes within a composite to control the release of internal prestress energy for external utility.

The preparation of materials by the rule of this current invention is directly related to the steps by which prestress is induced. This invention teaches two methods of preparing these dynamic polymer composites. The two methods are the prestress prior to envelopment method and the prestress after envelopment method. It will be understood by one skilled in the art that some initial prestress present in the fibers is lost to bring the polymer matrix up to a balanced stress. It will also be understood by one skilled in the art that the external means to induce prestress is dependent upon shape. For example to induce prestress in a hollow shape may require a mandrel and to induce prestress in a linear shape may require opposing restraints.

This invention teaches that the continuous stress transfer in the bond between the fiber and the polymer matrix is necessary to be able to contain and restrain high prestress levels which yield high external utility. It will be understood by one skilled in the art that a high prestress causing loss of bond between the fiber and the polymer matrix may be moderated by coating, saturating, and impregnating the fiber with an intermediate material possessing a higher bond-strength than the polymer selected for the matrix.

In the prior art the stiffness of high-modulus fiber has been used for rigidity of structure and spring action. In one class of embodiments this present invention uses the stiffness of high-modulus fiber, prestressed in bending, controlled and restrained by and within a polymer matrix for shrink actuation. Although other embodiments for this present invention exist for the use of straight fibers and straight fiber bundles, the design versatility of the invention would be compromised without the use of coiled, swedged, crimped and otherwise spring-shaped fiber to extend the potential of the fiber's elongation, and therefore the composite's range of dimensional change and strain. Not all fibers can be easily deformed, particularly the high-modulus fibers which find advantageous use in this present invention. However, even carbon fiber bundles have been made that will provide the elongation required, reference McCullough, Jr. et al. in U.S. Pat. No. 4,837,076 and Kitajima in U.S. Pat. No. 5,183,603. McCullough, Jr. et al. used the coil-like bundles in a composite for impact resistance in U.S. Pat. No. 4,868,038. These coil-like fibers and fiber bundles have been provided in the prior art without having been used for prestress internal to the composite.

In the prior art there are various polymers which respond to temperature, light, moisture, age, or chemical media. Both thermomechanically expanded films and shapes, commonly called "shrink polymers" produce relative weak constriction force and lack a mechanism to control the amount of force. Expanding polymer foams share similar lacks. Douglas in U.S. Pat. No. 4,978,564 combines the elements of heat responsive polymer foam with a composite. He uses a heat-activated expanding foam to deploy a conductive wire surrounded by an uncured composite sheath for use in space. Unlike this present invention, Douglas's composite is not the responsive member. Douglas shapes the uncured composite, Douglas does not prestress it.

The heat-activated smart composites of this present invention share similar functions with expanded polymers sold as heat-shrink tubing. For example heat-shrink Polyolefin tubing is sold by 3M and Cryovac Division of W. R. Grace for use as electrical insulation. When heated above the glass-transition-temperature (Tg) these expanded Polyolefin tubes exert a weak constrictive force as they shrink to cover wire splices. Meltsch in U.S. Pat. No. 4,442,153 presents a shape-memory-polymer cable sleeve with such weak constriction force that it can be held together by "gluing, riveting, sewing" (see column 5 line 7). In contrast heat-shrink tubing constructed from a composite according to the rule of this invention, generates a substantial constriction force when heated due to the prestressed fibers which are released by the heat-softened thermoplastic matrix. When cool the resultant composite splice can be stronger than the original wire or cable, exhibiting structural assembly properties.

In the prior art there were various actuators that used shape memory metal alloys for actuators. An example is by Darin Mckinnis of Johnson Space Center as described in NASA Tech Briefs, March 1993. Mckinnis uses a heating element within a hollow shape-memory metal alloy cylinder composed of nickel and titanium to break shearpins and release a bolt. Shape memory metal alloys have demonstrated the simplicity and reliability of responsive dimensional change in a material used as an actuator. However, no shape memory metal alloy has the time-dependent self-activating function of this present invention.

In the prior art various controllers, such as electronic timers, sensors, and relays have been used to restrain force-generating devices such as springs, pressure reservoirs, pumps, motors, and solenoids to create complex, bulky actuator mechanisms. This present invention provides a material for actuation which may be incorporated into deployment, retraction, contraction, and expansion mechanisms that combine force and control functions in one material.

SUMMARY OF THE INVENTION

1. Objects of the Invention

A general object of this invention is to provide a family of responsive composite materials which generate substantially greater forces than responsive polymers.

Another general object of this invention is to provide a highly-reliable, light-weight, self-activating material for incorporation into mechanisms where delayed or periodic human intervention is either untimely, inaccessible, or hazardous.

Another general object of this invention is to provide greater design diversity than with other responsive polymer materials due to the functional segregation within a composite.

It is another general object of this invention to teach methods of preparing this invention's composites.

An object of this present invention is to provide a material that generates time-dependent displacement and force in a more predictable manner.

Another object of this present invention is to provide time-dependent dynamic materials which are more resistance to transient temperatures experienced during shipping, storage, and use.

Another object of this invention is to provide responsive materials which, because of their polymer matrix, are responsive to a greater number of activation methods such as temperature, light, moisture, age, or chemical media.

Another object of this invention is to provide a responsive material that generates force over a wider range of dimensional change by using deformed fiber.

Another object of this invention is to provide a responsive material which uses high-modulus fiber stiffness for incorporation into dispensers which evacuate more of their contents.

Another object of this invention is to provide a material which creates a greater circumferential compression when incorporated into hollow shapes for shrink actuation, assembly, and dispensing.

Another object of this invention is to provide a material with longitudinal reinforcing fibers for incorporation into shrink-fit structural assembly connectors which are easier to use.

Another object of this invention is to provide a responsive material which by selection of the polymer matrix without reference to the force generating function allows functional selection for dielectric strength and for resistance to natural and synthetic substances.

Another object of this invention is to provide a material which may be incorporated into actuators for deployment, retraction, contraction, and expansion mechanisms replacing complex and expensive electro-mechanical actuators.

Another object of this invention is to provide a material which mates high-modulus fibers with low-modulus polymers by incorporating transverse fibers to reduce localized bearing, bond, and shear stresses in the polymer matrix.

2. Features of the Invention

In keeping with these objects and others which will become apparent hereinafter, one feature of this invention resides, briefly stated, in a dynamic polymer composite which generates dimensional change and force due to the delayed release of the prestress latent within a multitude of fibers constrained and controlled within and by a polymer matrix which yields in a predetermined manner.

Another feature of this invention is to teach that the key to the design versatility of this new family of composites is the polymer matrix which controls the release of the fiber tension. Depending on the polymer selected for the matrix the composite response may be either self-activated time-dependent due to creep, or on-demand externally-activated based on exposure to independent stimulus such as heat, light, or chemicals. One skilled in the art will recognize the opportunities offered for applications using these two attributes independently and in combination. An example of a combined function is a time-dependent bearing lubricator constructed by the rule of this invention with a thermoplastic matrix. The thermoplastic is predetermined to creep-induce dispensing over a two year duration. Anywhere on the creep curve, the thermoplastic has the potential to serve as a fail-safe backup controller to dispense the remaining charge of lubricant if the starved bearing heats the lubricator above Tg.

Viscoelastic behavior of responsive polymers has proved to be difficult to explain and predict. Various models of molecular entanglement have been used to explain how the opposing entropy related functions of storage and release occurred within a homogeneous material. The moduli for a polymer can vary due to thermal and flexural history. In this current invention, force storage and control have been functionally segregated to separate components. The fiber stores the energy and the polymer controls the energy release. This segregation of function simplifies design because the relevant moduli are robust for fibers and polymers. A wide range of force responses can be easily predicted from a single composite by varying the prestress. The functional segregation of this invention also substantially improves design diversity. The many fibers, wires, and polymers used in structural composites are also used in this present invention for an array of component combinations. Each combination of fiber and polymer matrix is a unique member of the family of composites within this present invention. Thus there exists a breadth of composite selections to satisfy each embodiment in terms of force, strain, work, delay, duration, and activation method.

While any type of fiber can be used, the typical fiber used will be a high-modulus fiber such as graphite, duPont's Kevlar(r), Aramid(r), glass, steel, or oriented polyethylene. The polymer matrix may be natural and synthetic, thermoset and thermoplastic types. Some preferable matrix materials of the thermoset category are polyamide, epoxy, and polyester. Some preferable materials of the thermoplastic category are polyamide and PEEK. One experienced in engineered composites will realize the design versatility offered by the ability to select the fiber and fiber/matrix ratio based upon the total force required, to select the fiber shape to provide the elongation required, and to select the polymer to fit both the activation method and the conditions encountered. Some matrix candidate polymers are severely compromised in the presence of certain oils and chemicals. For example the heat-shrink attributes of expanded polyolefins are nullified when exposed to mineral oil. A preferred embodiment of this composite material is wherein said polymer matrix is selected to be unaffected by long-term contact with hydraulic fluid when incorporated into the structure of a reservoir to act as a hydraulic actuator.

In related art Bettinger in U.S. Pat. No. 5,188,260 discloses dispensing using shrink materials. A preferred embodiment of this invention is as a shrink composite material incorporated into a time-dependent shrink lubricator. Such lubricators with dispensing durations of two to five years have potential for vehicle suspension lubrication because they extend lubrication intervals. Expanded polymers alone cannot yet generate by viscoelastic constriction the 5000 psi which may be required for hydraulic lubrication in cold weather. It is believed that this current invention can provide these pressures and higher.

A preferred embodiment of this present invention is a family of self-activating time-dependent materials which exhibit long-term dimensional change. It is well known that structural composites under long-term load conditions exhibit creep. In the prior art, creep was an undesirable factor for composites and was minimized or eliminated by design. In this preferred embodiment, the invention uses the long-term creep of a polymer matrix to slowly release the entropy stored within the fiber prestress.

The key to time-dependent composites is the yielding of the polymer matrix to the stress induced by the pretensioned fibers. When a plastic is subjected to a constant static load it deforms quickly to a strain roughly predicted by its stress-strain modulus. It then continues to deform at a slower rate indefinitely, or if the load is high, until rupture occurs. This phenomenon, which also occurs in soft metals and structural concrete, is called creep. Creep curves generally show three continuous stages: a first stage marked by large and rapid initial deformation; a second stage where deformation continues at a relatively slow, constant rate; a third stage in which rupture occurs. In ductile plastics, third-stage creep usually includes a distinct elongation or yielding just prior to rupture. In nonductile plastics, rupture occurs abruptly at the end of second-stage creep. The second stage creep is of particular interest to this invention because the deformation can continue at nearly a constant rate over months or years based upon the polymer matrix selected. Thus, many applications now requiring a complex electromechanical timer device can be satisfied with an actuator incorporating this invention's material.

It will be understood by one skilled in the art that fill material, short fibers, and filaments may be used to reinforce a polymer matrix to resist high initial compressive forces and to generate the creep resistance required for long durations of time-dependency. Simplified creep measurement by vibrational analysis has been used by Gibson which allows the creep performance of complex filled polymer alloys to be predetermined.

Many shape memory polymers are temperature sensitive due to a low Tg because their mechanism of dimensional change is viscoelastic. Their use in time-dependent applications is limited. For example, Mitsubishi Heavy Industries, Ltd. offers a number of polyurethanes in their MM, MS, AND MP series. None of these have a Tg above 55 degrees Centigrade. For time-dependent embodiments this current invention utilizes polymers which are much less temperature sensitive because the entropy release mechanism is creep rather than viscoelastic flow. Time-dependent composites with a thermoset matrix are inherently temperature insensitive. Time-dependent composites using a thermoplastic matrix will have a higher Tg because they are selected for creep not for viscoelastic flow.

The segregation of functions between the fiber and the polymer matrix also give advantages to the present invention when the application requires resistance or compatibility with some substance exposure inherent to the application. A preferred embodiment of this current invention is the composite material wherein said polymer matrix is selected for dielectric strength to provide insulation for electrical connections. Another preferred embodiment of this current invention is the composite material wherein said polymer matrix is selected to be unaffected by long-term contact with lubricant when incorporated into the structure of a reservoir to act as a lubricator.

This invention teaches that composites can replace many complex mechanisms and many hazardous human work activities. There are many mechanical, electrical, and hydraulic mechanisms which are complex and expensive. And there are many human activities, such as periodic lubrication in a nuclear plant that should be made to be infrequent. A thesis of this invention is that a higher and better use of high-modulus fiber and polymer composites is as dynamic actuators, rather than as structural components substituted for other inert materials to gain stiffness or reduce weight.

The responsive attributes of this present invention can be delayed and subordinated to a need for structural stability in an adaptive or "smart" structure. To this end the responsive and time-dependent attributes of the invention may be dormant until activated and the typical structural composite attributes of strength with stiffness and light weight will predominate.

This invention teaches that the preferred embodiments may be incorporated into devices for dispensing, lubricant dispensing, structural assembly, wire and cable assembly, hydraulic/pneumatic actuation, mechanism actuation, shrink sleeving for packaging, and smart structures. These applications are meant to be representative rather than limiting on the breadth of applications possible within the family of composites of this current invention which the claims disclose.

It will be understood by one versed in the art that in some embodiments, multiple reprocessing of the material for reuse will be an integral part of the application.

DESCRIPTION OF THE PREFERRED EMBODIMENTS

In the following figures like elements are numbered in common. Also in the following figures arrows indicate the direction of potential dimensional change, generated force, and external utility in embodiments of this invention prior to activation.

Figure 1:
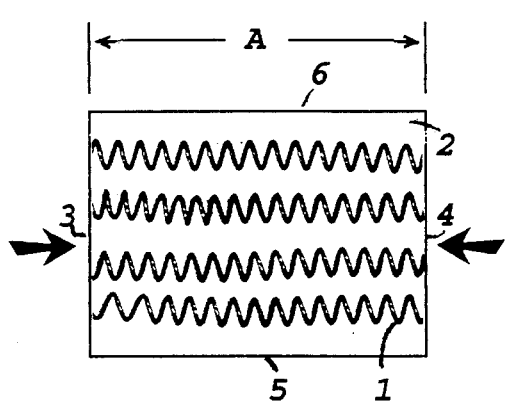
FIG. 1 is a section through the composite material of the current invention with the material possessing balanced prestress in its initial state ready for use.

FIG. 1 illustrates a preferred embodiment of the invention wherein said material is externally restrained by incorporation into a mechanism so as to function as an actuator. The figure shows the initial prestressed state of this invention as a composite material comprising; a multiplicity of oriented prestressed fibers 1 constrained within and by a polymer matrix 2 which possesses an opposing and balanced prestress. Prior to activation said composite possesses a dimension of A at face 6.

Figure 2:
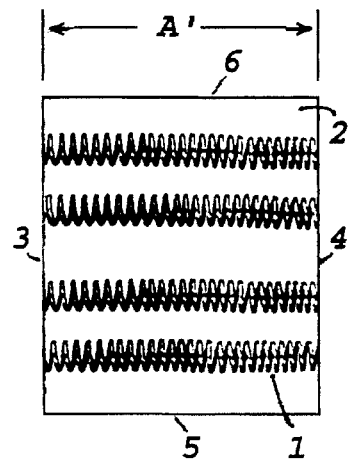
FIG. 2 is a section through the composite material of FIG. 1 after it has been activated.

FIG. 2 illustrates the preferred embodiment of FIG. 1 after activation wherein said matrix 2 has been predetermined to deform by delayed yielding to said opposing prestress to generate a dimensional change resulting in a reduction of A in FIG. 1 at face 6 to A' in FIG. 2 at face 6, proportional dimensional changes at faces 3 and 4 are due to poisson's ratio, and the potential for a transfer of said fiber prestress to an external utility at any face 3, 4, 5, or 6 has been exhausted.

A preferred embodiment of preparation is the prestress prior to envelopment method which comprises the steps of prestressing said elastic fibers by external means, enveloping said fibers within a polymer matrix, stabilizing said matrix, and releasing said fibers from said external prestress restraint to seek a stress balance with said matrix.

Another preferred embodiment of preparation is the prestress after envelopment method which comprises the steps of enveloping said elastic fibers within a fiber matrix, softening said matrix, post-tensioning said elastic fibers by external means, stabilizing said matrix, and releasing said fibers from said external post-tensioning restraint to seek a stress balance with said matrix.

Figure 3:
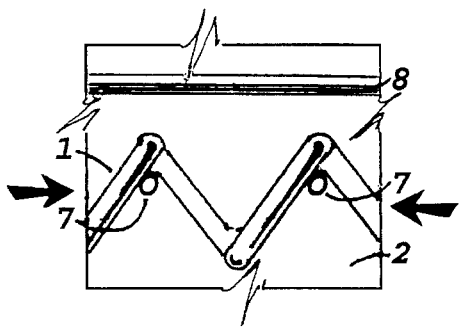
FIG. 3 is a partial section through the composite material of the current invention showing reinforcement and heating elements.

FIG. 3. shows a composite material wherein said prestressed fibers 1 or fiber bundles 1 are coiled, crimped, and swedged so as to extend said dimensional change. The prestressed fibers 1 contact transverse non-prestressed fibers 7 to dissipate localized stress concentrations into said polymer matrix 2. Electrical resistance heating elements 8 are incorporated into said polymer matrix 2 for activating dimensional change by heating said thermoplastic polymer matrix 2 above Tg.

Figure 4:
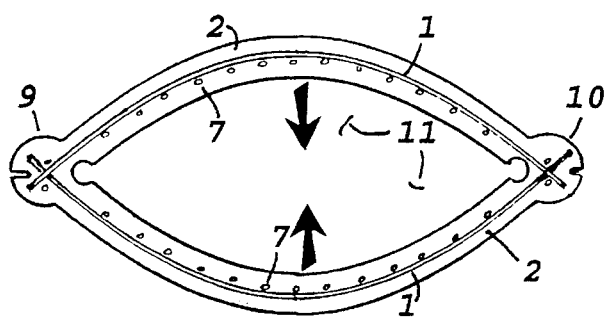
FIG. 4 is a section through a dispenser incorporating the composite material of the current invention prior to activation.

FIG. 4. shows a preferred embodiment of a shrink dispenser wherein said prestressed fibers 1 are restrained as bent rods within and by said polymer matrix 2 to utilize said fiber's inherent stiffness in prestress for thorough dispensing of the hydraulic or pneumatic media 11. Reinforcement means is provided at 9 and 10 to resist end-stress concentrations of the bent fibers 1. Pressure is generated by said fibers 1 as they straighten upon said media 11 for external utility. As said bent fibers 1 straighten, the two internal faces of the lubricator approach to exhaust nearly all media 11. The media 11 can effect said material and as a result said polymer matrix is selected to be unaffected by long-term contact with hydraulic fluid when incorporated into the structure of a reservoir to act as a hydraulic actuator.

Figure 5:
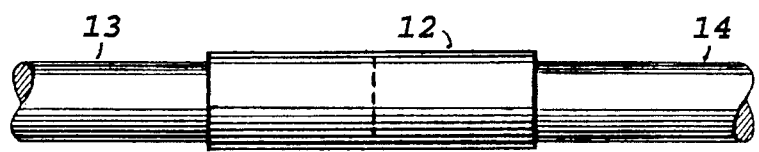
FIG. 5 is an elevation of two cylindrical structural elements, wires, or cables joined after and by the forceful constriction of a heat-shrink composite of this invention incorporated into a connector.

FIG. 5. shows a preferred embodiment wherein said polymer matrix is selected to activate dimensional change in response to heat, light, aging, or chemicals. In this figure the preferred embodiment is incorporated into a tubular shaped structural constriction connector 12 which has utility as a wire and cable shrink insulator and connector. Said polymer matrix is selected for dielectric strength to provide insulation for incorporation into electrical connections. This composite connector 12 consists of a tubular shape joining together two wires, cables, or structural elements 13 and 14.

Figure 6:
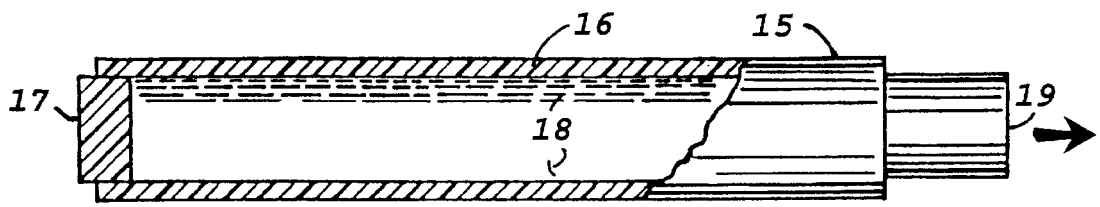
FIG. 6 is a partial section of a hydraulic actuator showing the resultant utility created as a result of incorporating this invention.

FIG. 6. shows a preferred embodiment wherein said polymer matrix 16 is selected to be unaffected by long-term contact with lubricant 18 when incorporated into the structure of a shrink lubricator 15. By careful matching of fiber and polymer a time-dependent composite material 16 can be prepared wherein said dimensional change is due to the creep of said polymer matrix yielding a duration of weeks, months, or years. When the composite shrink-tube 15 experiences creep, or release due to heat activation, an internal pressure is exerted upon the reservoir charge 18 by radial constriction of composite material 16 which results in an increase in pressure, restrained by closure 17, which is transmitted by the fluid 18 through opening 19 for external utility.

Figure 7:
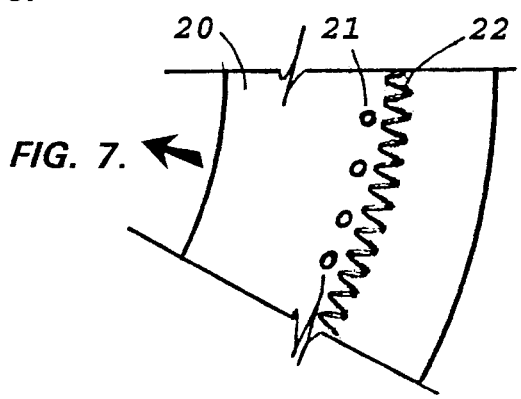
FIG. 7 is a partial transverse section through a tubular dispenser or actuator as shown in FIGS. 5 and 6.

FIG. 7. shows a preferred embodiment of the current invention incorporated into a hollow constriction device as otherwise shown in FIGS. 5 and 6. The prestressed fiber 22 is a wrapping of infinite length which exerts hoop compression upon the polymer matrix 20. When the polymer matrix 20 is activated, the dimensional change is a reduction in circumference, resulting in a radial constriction which reduces the hollow constriction device in size. Thus said prestressed fiber 22 is circumferentially oriented within the walls of a container or hollow construction for shrink actuation, assembly and dispensing.

Another preferred embodiment is also illustrated in FIG. 7 in which said material is reinforced by longitudinal fibers 21 for incorporation into connectors for structural assembly; said longitudinal fibers serve to carry connective loads between the structural elements to be connected.

Another preferred embodiment can also be construed from FIG. 7 to combine both structural and dynamic functions within one composite material requires that the level of said prestress is restricted so as to allow said composite material to resist any added external forces without overstressing either said fiber 22 or said polymer matrix 20, acting as an inert structural material prior to activation.

The invention claimed is:

1. A composite material comprising a multiplicity of prestressed high modulus fibers circumferentially oriented within the walls of a hollow construction, said prestressed fibers constrained within and by a polymer matrix which possesses an opposing and balanced prestress, wherein said matrix is capable of yielding to said prestress to generate a dimensional change, said dimensional change resulting in a constriction of said hollow construction.

2. The composite material of claim 1 wherein said dimensional change is due to the creep of said polymer matrix.

3. The composite material of claim 1 wherein said polymer matrix is selected to activate dimensional change in response to heat, light, aging, or chemicals.

4. The composite material of claim 1 wherein said prestressed fibers are coiled, crimped, and swedged to extend said dimensional change.

5. The composite material of claim 1 wherein said prestressed fibers are constrained as bent rods to utilize the inherent stiffness of the fibers.

6. The composite material of claim 1 further comprising longitudinal fibers.

7. The composite material of claim 1 wherein said prestressed fibers contact transverse fibers to dissipate stress into said polymer matrix.

8. The composite material of claim 3 wherein electrical resistance heating elements are incorporated into said polymer matrix for activating said dimensional change.

9. The composite material of claim 1 wherein said material is externally restrained by incorporation into a mechanism so as to function as an actuator.

10. A hydraulic actuator comprising the composite material of claim 1 filled with a hydraulic fluid wherein said polymer matrix is unaffected by long term contact with the hydraulic fluid.

11. A shrink lubricator comprising the composite material of claim 1 filled with a lubricant wherein said polymer matrix is unaffected by long term contact with the lubricant.

12. A electrical connection comprising the composite material of claim 1 and two or more electrical conductors, wherein said composite material is in the form of a tube and wherein said electrical connection is made by a process comprising the steps of inserting an end portion of each of the two or more conductors into opposite ends of the tube and activating the yielding of the polymer matrix whereupon the dimensional change produces a clamping force on said conductors to make an electrical connection and wherein said polymer matrix has suitable dielectric properties for use as insulation in an electrical connection.

13. A structural connection comprising the reinforced composite of claim 6 and two or more independent structural elements, said structural connection made by a process comprising the steps of placing an end portion of each of the two or more structural elements inside the hollow portion of the composite material and activating the yielding of the polymer matrix, whereupon said prestressed fibers compress and constrain said longitudinal fibers within said polymer matrix, and said dimensional change produces a clamping force on said structural elements so that said reinforced composite transfers structural loads between said elements.

* * * * *